United States Patent

[11] 3,560,007

[72] Inventor Ramon J. Ascencio
  Chicago, Ill.
[21] Appl. No. 781,921
[22] Filed Dec. 6, 1968
[45] Patented Feb. 2, 1971
[73] Assignee Felt Products Mfg. Co.
  a corporation of Delaware

[54] GASKET ASSEMBLY
  4 Claims, 5 Drawing Figs.

[52] U.S. Cl. .................................................. 277/235,
  277/180
[51] Int. Cl. ....................................................... B65d 53/00,
  F02f 11/00, F16i 15/00
[50] Field of Search ............................................ 277/166,
  180, 235B; 29/428

[56] References Cited
UNITED STATES PATENTS
3,433,490  3/1969  Teucher et al. ............... 277/164
  680,860  8/1901  Hauslehner ................... 29/428

1,748,582  2/1930  Oven ............................ 277/235B
1,815,602  7/1931  Russell ......................... 277/235BX
1,819,694  8/1931  Sperry .......................... 277/235B
2,795,444  6/1957  Nenzell ........................ 277/180

FOREIGN PATENTS
1st-  9/1962  France .......................... 277/180
add.79,092
278,223  10/1927  Great Britain ................. 277/235B
393,012  10/1965  Switzerland .................. 277/180
1,457,402  9/1966  France .......................... 277/235B Primary Examiner—Martin P. Schwadron
Assistant Examiner—Robert R. Bunevich
Attorney—Dressler, Goldsmith, Clement & Gordon ABSTRACT: A head gasket assembly and method of assembly. A head gasket defines a combustion opening with armor in the opening and spaced from the periphery of the opening. A plurality of tabs project into the combustion opening for suspending the armor in spaced relation to the combustion opening.

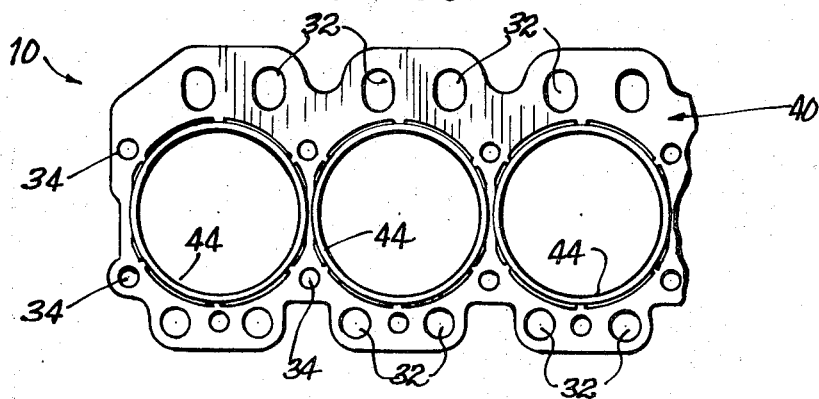
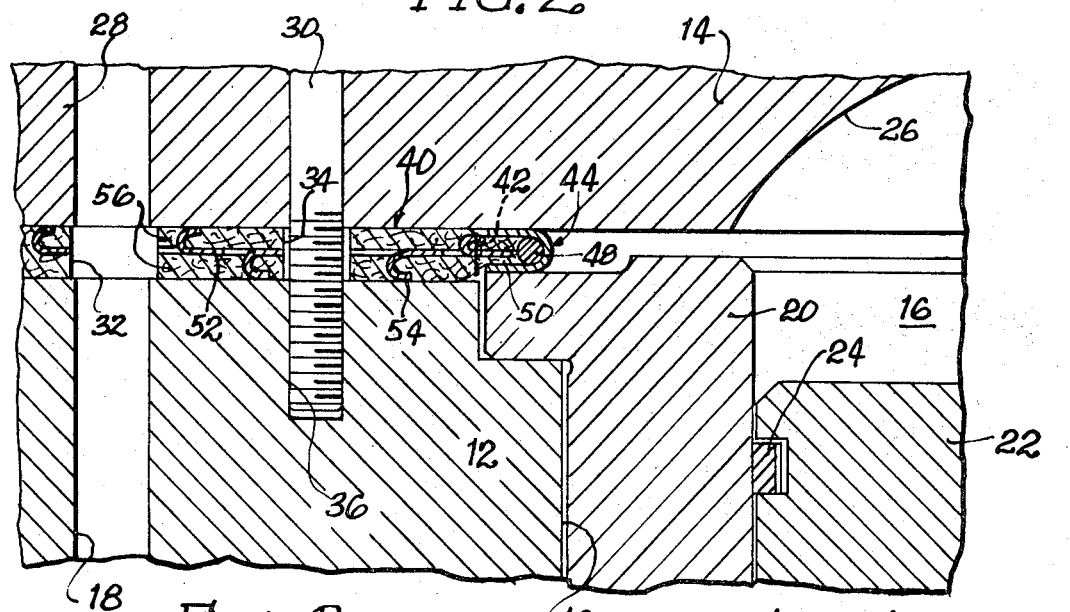
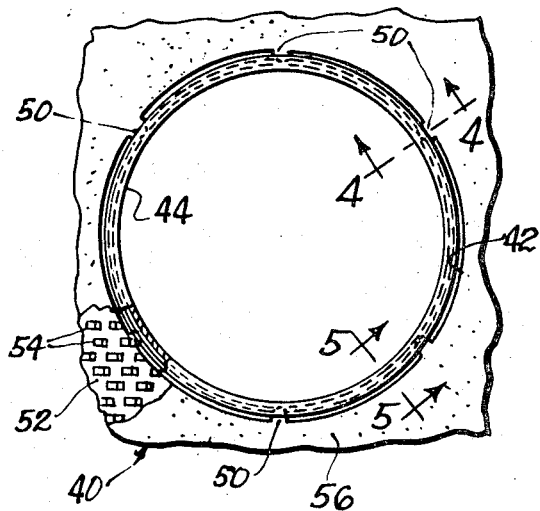
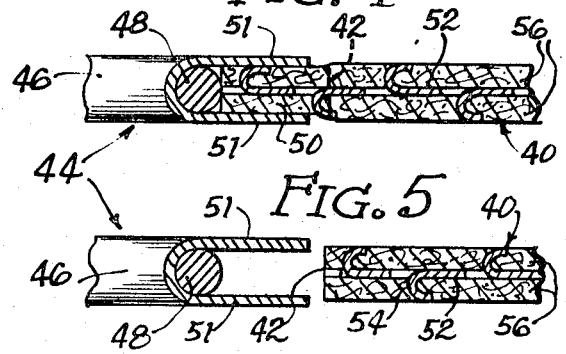

GASKET ASSEMBLY

There are a variety of head gaskets known in the prior art. Head gaskets generally comprise thin flat bodies which define a plurality of apertures, including oil and water openings and cylinder openings. These apertures are positioned in the gasket body to be aligned with cylinder bores and with water and oil ports in an engine block and engine head. The gasket body itself is intended to seal around the apertures in it to prevent bore and port intercommunication.

In large high compression engines operating at high temperature and high pressures, it has been a practice for a number of years now to provide head gaskets with armoring adjacent the cylinder or combustion openings to seal the cylinder openings and to protect the remainder of the gasket from the affects of the high temperature and pressure. Quite frequently the gasket body itself comprises an asbestos or reinforced asbestos or impregnated asbestos packing material, which body is then provided with the aforementioned armor. A construction of that general character which is known to the art is illustrated in U.S. Pat. No. 1,819,694. In that construction, the entire gasket surface as well as the cylinder openings in the gasket are armored.

It has been found subsequently that armor enclosing the edge of the gasket body adjacent the cylinder opening is sufficient to protect the gasket and to seal the head and block at the cylinder bore. In one typical construction, also known to the art, a main gasket body comprises sheets of impregnated asbestos secured to opposite sides of a metal sheet. The combustion openings in the gasket body are enclosed by U-shaped metal annuli which surround the cylinder bores. These U-shaped annuli surround the periphery of the combustion openings and extend outwardly over and under the periphery of the opening. Although such constructions are suitable for many applications, they are not for others. In some constructions for which they are suitable, they do not always seal correctly and therefore cause serious sealing problems.

In accordance with this invention, an improved gasket assembly is provided which is suitable for use in applications for which prior art assemblies are not suitable. They are also well suited for applications in which prior art assemblies were suitable. In some respects, the gasket assembly of this invention isolates the functions of the main body of the gasket and the cylinder bore armored sealing gasket means while providing an integrated assembly which may be handled and utilized as a single unit. Further, the gasket assembly of this invention is simpler and less expensive to make even though it may be used in environments which were marginal and unsuitable for the known types of gasket assemblies.

To that end, a gasket assembly, such as a head gasket assembly, of this invention comprises a main gasket body defining a combustion opening proportioned and positioned to surround a cylinder bore. Within, but slightly spaced inwardly of the periphery of the combustion opening, a second gasket means is provided, the second gasket means being adapted to be sealingly compressed between an engine block and a head. The second gasket means is suspended in the combustion opening in the main gasket body by a plurality of peripherally spaced elements which bridge the space between the second gasket means and the main gasket body and which operatively interconnect the two. Preferably, the second gasket means is an armored gasket means which may comprise a U-shaped metal annulus which opens towards and receives the bridging elements. The elements, which may be tabs, are integral with the main gasket body and project inwardly of the periphery of the combustion opening. Although the gasket assembly is generally flat, the gasket means lying generally parallel to and generally within the combustion opening, it will be apparent that in use the gasket means may be displaced somewhat with respect to the main body without disturbing the main body portion adjacent the edge of the opening.

Further purposes, objects and advantages of this invention will become apparent from the following description and appended drawings showing a presently preferred embodiment, of which:

FIG. 1 is a plan view of a cylinder head gasket constructed in accordance with this invention;

FIG. 2 is a sectional view through a head and engine block with which a gasket of FIG. 1 has been assembled;

FIG. 3 is an enlarged plan view of a portion of FIG. 1;

FIG. 4 is an enlarged sectional view taken substantially along the line 4-4 of FIG. 3; and FIG. 5 is an enlarged sectional view taken substantially along the line 5-5 of FIG. 3.

Referring first to FIGS. 1 and 2, a head gasket assembly 10 of this invention is adapted and proportioned to cooperate with an engine block 12 and an engine head 14. It is, of course, apparent that a variety of engine block and head configurations, hence head gasket assembly configurations, may be employed in accordance with this invention.

Block 12 defines a plurality of apertures including a plurality of cylinder bores 16 and a plurality of cylindrical oil or water bores 18 (only one of each of which bores 16 and 18 are illustrated in FIG. 2). Cylinder bores 16 are fitted with cylinder sleeves 20 which sealingly engage the cylinder wall and serve to cooperate with a piston 22 and piston rings 24 in a known manner. Head 14 defines a dome-shaped portion 26 overlying cylinder bore 16, and further defines a plurality of oil and water bores 28 which are aligned with complementary bores 18. Threaded bolts 30 connect the head and block and serve as the means for compressing gasket assembly 10 into sealing engagement with the block and head around the apertures therein.

As seen in FIGS. 1 and 2, gasket assembly 10 defines a plurality of apertures or openings. These include oil and water apertures 32 which are proportioned and positioned to surround the confronting ported ends of bores 18 and 28. Apertures 32 permit flow communication between bores 18 and 28 and sealingly prevent leakage of fluid beyond the apertures 32. Bolt holes 34 are also provided in the gasket assembly to accommodate passage of bolts 30 through head 14 and into threaded engagement with cooperating threaded holes 36 in the block.

Finally, the gasket assembly defines a plurality of apertures which surround the cylinder bores, adjacent which apertures the cylinders are sealed from the surrounding portions of the gasket body. To that end, the main gasket body 40 defines a plurality of clear through combustion openings 42. A second gasket means is provided within the periphery defined by each of these openings. As shown in the drawings, a second gasket 44 comprises a generally U-shaped metal annulus 46 which is parallel to the coplanar with the main gasket body. In the closed end of the annulus, a wire ring 48 is provided to assist in sealing in a manner known to the art. The open end of the U-shaped annulus opens towards the periphery of the combustion opening 42 but is slightly spaced therefrom, as is most clearly illustrated in FIG. 5.

It is to be noted that second gasket 44 is secured to and suspended on main gasket body 40 and that it is suspended within opening 42. That is accomplished via a plurality of discrete, narrow, peripherally spaced bridging elements, which in the embodiment illustrated are integral with main gasket body 40. These bridging elements or tabs 50 project from the periphery of combustion opening 42 towards second gasket 44. They project far enough so that they reach into the open end of annulus 46 to be held or gripped therein by annulus legs 51 to suspend and position the second gasket. The engagement of the annulus with the tabs 50 is best seen in FIGS. 2 and 4. Tabs 50 also serve to assist in positioning ring 48 within the annulus until the assembly is placed under compression. Except for the bridging tabs 50, it will be apparent that the preponderance of the space between the combustion opening periphery and the second gasket means is open.

The main gasket body itself is a multilayer assemblage. In the embodiment illustrated, body 40 comprises three layers. Central layer 52 is a metal sheet which has had prongs punched outwardly from both sides. Each side of central layer 52 is fitted with a sheet of impregnated asbestos 56. The impregnant may be a conventionally used and known temperature, oil and water resistant impregnant. The sheets are superposed with each other and are pressed together, the prongs folding to the positions illustrated to hold the sheets to the central layer. Thereafter, the apertures and openings above mentioned are formed as by punching.

When the openings 42 are formed, it will be clear that tabs 50 are left to project inwardly of the periphery toward the second gasket means. The forming or punching operation, therefore, is performed with a suitable configured punching die, i.e., one which is shaped to the desired opening shape, but which has peripherally spaced notches conforming in size and shape to the tabs 50. After the opening is formed, the free ends of the tabs project into the opening and are positioned to accommodate an annulus. The annulus is positioned in the opening and spaced from the periphery thereof with the free ends of the tabs within the opening in the annulus and between the legs thereof.

As seen in FIG. 4, the thickness of tabs 50 is slightly less than the thickness of main body portion 40. The tabs may be so shaped by a partial precompression of the tabs or during the forming of the U-shaped annulus about the wire and on the tabs. Of course, in use, as seen in FIG. 2, second gasket 44 and the captured portion of tabs 50 may be compressed to a thickness substantially less than the compressed thickness of main gasket body 40.

Because the tabs are widely spaced, the impregnated asbestos tabs may be deformed to take a permanent set of substantially lesser thickness. This means that the tabs will not interfere with the second gasket means which is the element intended to seal the combustion opening.

In a typical gasket assembly of this invention, a main gasket body 40 is about 0.045 inch thick, a butt-welded soft steel annealed wire ring is about 0.036 inch in diameter, a U-shaped metal annulus is formed of 0.006 inch type 321 stainless stock, the legs of which to the base of the U-shaped annulus have an extent of about 0.125 inch as viewed in FIG. 4, and the combustion opening is about 5 inches in diameter.

It will be understood that the gasket assembly 10 is subjected to different conditions at different locations. At the armored cylinder openings, extremely high temperatures and pressures of up to as much as 2400 p.s.i. are encountered. Further, the cylinder openings are exposed to flame and sparks. However, the pressure of the oil and water in bores 18 and 28 seldom exceeds 100 p.s.i. This then requires a much greater sealing force at the cylinder bore than at the oil and water apertures.

The gasket assembly of this invention provides many notable advantages over prior art head gaskets. In prior art gaskets, a typical U-shaped metal annulus provided portions confronting the upper and lower surfaces of the main gasket body around the entire periphery of the combustion openings 42. With a head gasket of that type, a very substantial amount of pressure was necessary to coin the legs of the "U" into the planes of the gasket body surfaces. Of course, until there was such coining the gasket assembly would not seal around the oil and water apertures, nor would it effectively seal around the cylinder bore.

In a typical prior art gasket of the type just referred to and incorporating a central layer, two impregnated asbestos facing sheets and having an overlapping U-shaped annulus of the type referred to, substantial coining pressures were required. For an overlap of the legs of the "U" with a main gasket body of about 0.060 inch and with an opening diameter of about 5 inches, almost one square inch of metal required coining into the gasket body. It took almost 20,000 lb. of force to coin the legs into the gasket body and to the level of the surface planes of the gasket body.

From the illustrations herein, it is seen that the small peripherally spaced tabs which are six in number and which are approximately of the same dimension in radial and peripheral extent (even assuming an overlap of the tabs of 0.060 inch by the legs of the U) present a very small area where coining is required, i.e., a very small fraction of the one square inch of a comparable prior art gasket. That means that an additional substantial force is available to compress the gasket assembly to a sealing condition and more than that which was available previously, assuming the same total amount of head and block assembly force is used. Because the full compressive assembly load is available for sealing (substantially none being required for coining), more effective sealing adjacent the oil and water apertures and at the cylinder bores is obtained. Elimination of the requirement of a substantial coining force also makes it possible to reduce the assembly load where other conditions made that feasible. It is also apparent that the nominal area of the tabs means that some force applied will compress them easily and very substantially. That being so, a thinner impregnated asbestos sheet may be used while still securing desired sealing at the oil and water apertures.

It has also been found that a head gasket assembly of this invention, i.e., one in which the cylinder gasket means is suspended from the main gasket body by a plurality of spaced bridging elements integral with one of the cylinder gasket means and main body, results in a more uniform head and block assembly with less effective warpage, bowing, and distortion of the head. In prior art constructions of the type described when bolts 30 are drawn down to provide the assembly force, the head will bow slightly because of the excessive coining forces encountered. That then results in forces other than tensile forces acting on bolts 30, sometimes resulting in fracture of the bolts. With gasket assemblies of this invention, the head and block assembly tend to retain their desired parallelism under compression and the head vibrates less when the engine is in use.

Yet another advantage of the gasket assembly of this invention is what may be described as an effective isolation of the cylinder gasket means from the main gasket body. As seen in FIG. 2, the second gasket means does not necessarily remain equidistant from the main body surfaces. That, as there shown, is because of the sleeve 20 standup, i.e., its its elevation above the top surface of the main body of the block. When that occurs with a U-shaped annulus overlying and underlying the main body as in the prior art constructions, the entire edge of the gasket body surrounding the opening will be raised upwardly around the combustion area. Especially where oil and water holes are quite close to the cylinder openings 42 or the cylinder openings are very close together, poor sealing and leakage has occurred, endangering the life of the gasket assembly and giving rise to unwanted intermixture of the fluids in the areas intended to be sealed from each other.

With bridging elements or tabs of this invention, their effective area and cross section being nominal, sleeve standup or offset of the second gasket with respect to the main body is a minimal problem. Indeed utilization of gasket assemblies in environments of substantial offset are contemplated where, for example, during assembly separation of the two gasket elements entirely may take place without affecting the sealing qualities of either.

It will be apparent from the foregoing that modifications of the embodiment illustrated may be made without departing from the spirit and scope of this invention.

I claim:

1. A head gasket assembly comprising: a generally flat main gasket body defining a plurality of apertures for sealing communication with a plurality of complementary cylinder ports in an engine block and an engine head, and defining a plurality of bolt holes therein for locating said head gasket assembly, a plurality of said apertures comprising a generally circular combustion opening for surrounding engine cylinder ports, armored gasket sections generally parallel to said main gasket body, said armored gasket sections each comprising a U-shaped metal annulus, said annulus opening outwardly toward a said combustion opening, said armored gasket section lying within said opening but being slightly spaced from the periphery of a said combustion opening, a multiplicity of narrow radially extending tabs bridging the space between said annulus and each said periphery and integral with said main gasket body to suspend said armored gasket section from said main gasket body, the substantial preponderance of the space between each said annulus and the periphery of each said opening being open.

2. In the head gasket assembly of claim 1 in which said armored gasket section further comprises a solid ring surrounded by said annulus.

3. In the head gasket assembly of claim 1 in which said main gasket body is a multilayer gasket assembly including a metal layer surrounded by a pair of resilient layers.

4. In the head gasket assembly of claim 1 in which said tabs are at least six in number and which are of substantially the same dimension in radial and peripheral extent.